United States Patent
Newman et al.

(10) Patent No.: US 6,262,889 B1
(45) Date of Patent: Jul. 17, 2001

(54) INSULATED MOBILE COMPUTER

(75) Inventors: Edward G. Newman, Fairfax Station; Michael D. Jenkins, Burke, both of VA (US)

(73) Assignee: Xybernaut Corporation, Fairfax, VA (US)

( * ) Notice: Subject to any disclaimer, the term of this patent is extended or adjusted under 35 U.S.C. 154(b) by 0 days.

(21) Appl. No.: 09/550,133

(22) Filed: Apr. 17, 2000

Related U.S. Application Data

(63) Continuation-in-part of application No. 09/092,261, filed on Jun. 5, 1998.

(51) Int. Cl.$^7$ ........................................... G06F 1/20
(52) U.S. Cl. ..................... 361/687; 361/683; 361/689; 361/697
(58) Field of Search .................................. 361/683, 687, 361/688, 697

(56) References Cited

U.S. PATENT DOCUMENTS

| | | | |
|---|---|---|---|
| 5,719,743 | * | 2/1998 | Jenkins et al. ..................... 361/683 |
| 5,719,744 | * | 2/1998 | Jenkins et al. ..................... 361/683 |
| 5,774,338 | * | 6/1998 | Wessling, III ..................... 361/730 |

* cited by examiner

Primary Examiner—Leo P. Picard
Assistant Examiner—Yean-Hsi Chang
(74) Attorney, Agent, or Firm—James J. Ralabate

(57) ABSTRACT

This invention involves a user supported hands free activated computer that controls to the extent possible the heat generated by computer components. Heat is an extremely important item since the computer is in contact with the user's body. The battery used to power the computer is also used as a heat insulating layer.

10 Claims, 3 Drawing Sheets

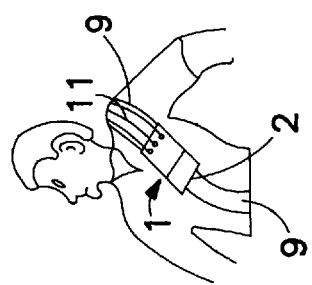
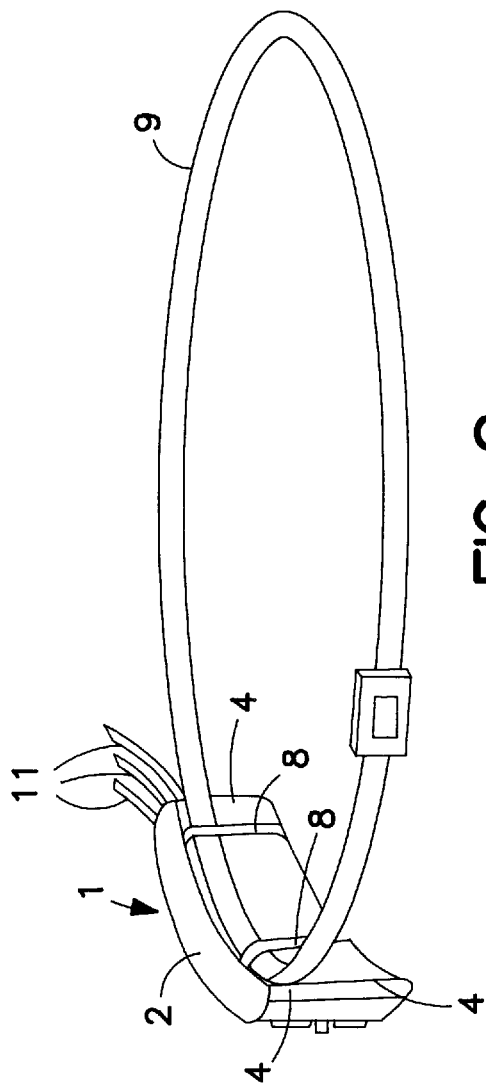
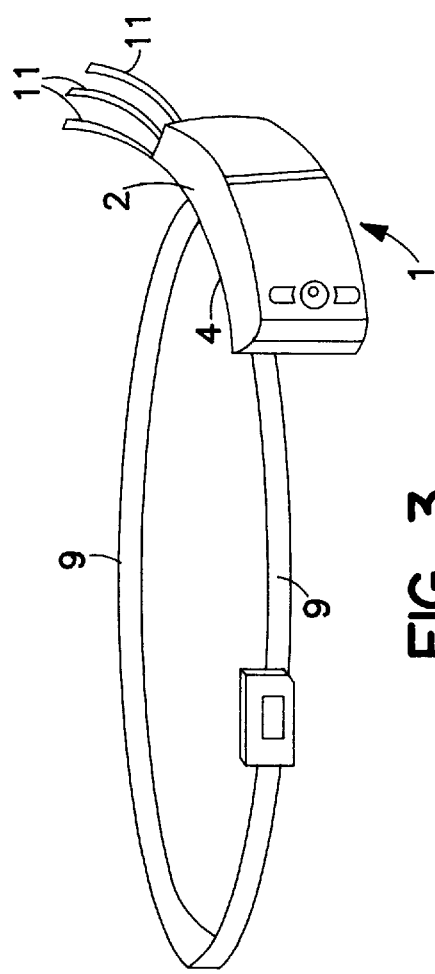

INSULATED MOBILE COMPUTER

This invention relates to a computer and, more specifically, to a user-supported mobile computer. This application is a continuation in part of parent application 09/092,261 filed in the U.S. Patent and Trademark Office on Jun. 5, 1998.

BACKGROUND OF THE INVENTION

Parent application Ser. No. 09/092,261 discloses a user-supported hands free activated computer constructed of heat-insulating materials. Computers have been known and used involving wearable computers and displays. The feature of these prior art computers is that they permit the user to have freedom to use his or her hands for repairing or other functions while using a fully functional computer. One of the most commercially successful and well known of these computers in the Mobile Assistant® available from Xybernaut Corporation of Fairfax, Va. Mobile Assistant® is a registered trademark of Xybernaut Corporation.

U.S. Pat. No. 5,305,244 (Newman I) describes the details of the Mobile Assistant® and fully discloses the components and function of such user-supported computers. Also, co-pending patent application Ser. No. 09/092,261 describes and claims further heat-insulating improvements and modifications to the Mobile Assistant®. Both U.S. Pat. No. 5,305,244 (Newman I), U.S. Pat. No. 5,844,824 (Newman II) and Ser. No. 09/092,261 are owned by the assignee of the present application.

Prior art patents also disclosing wearable computers are U.S. Pat. No. 5,285,398 (Janik I) and U.S. Pat. No. 5,491,651 (Janik (II). Both of these patents disclose a belt or vest containing computer containing pockets for the elements or components of a computer. In Janik I the plurality of computing elements are located on the belt and a flexible signal relaying means connects all of the elements for computing. A protective covering is used for enclosing said computer elements. In Janik II a similar belt computer is described and claimed in which the signal relaying means, the length of which between any two computing elements is greater than the distance between any two computing elements. In both Janik I and Janik II the flexible wearable computer is in the form of a belt comprising around its periphery sequentially positioned pockets or housings containing computer elements.

In both Newman I and II and Janik I and II, a body-worn computer is disclosed wherein the computer is worn in contact with a user's body. A serious problem in wearable computers could be the heat generated while in use and worn by the user.

SUMMARY OF THE INVENTION

It is therefore an object of this invention to provide a computer structure devoid of the above noted disadvantages.

Another object of this invention is to provide a computer structure that can be safely used with a minimum of computer generated heat in contact with a user's body.

A further object of this invention is to provide a computer structure that when worn can be used interchangeably on the right or left side of a user.

A still further object of this invention is to provide a mobile computer structure that can be worn safely on any portion of the body in a hands-free manner.

Yet another object of this invention is to provide a computer structure that contains substantially all of the components needed in a general purpose or conventional computer including but not limited to input/output means, processor means and storage means.

Yet still another object of this invention is to provide a mobile body-worn computer housing that contains all of the computer components plus a battery.

Other objects will become apparent upon a further reading of this disclosure.

The above objects and others are accomplished, generally speaking, by a computer structure that has all of the components of a conventional computer and a battery all in the same housing where the battery provides the bonus function of acting as an insulating layer. By "conventional computer" is meant any computer known and used today such as those available from IBM, Dell, Apple, Compaq, Toshiba, Micron, Hewlett-Packard etc. The computer structure of this invention in one embodiment has a computer housing that can be worn around the waist of the user and is curved on its inner side (the side that contacts the user's waist) to be contoured in accordance with the curvature of the user's waist. Obviously, it does not need to be curved if some other configuration is more desirable. It has structural dimensions or area that occupies only a portion of said user's waistline. Thus, unlike Janik I and II above discussed, the computer housing of the present invention does not encircle the entire waist of the user. When used as a waist-worn computer, it is important that cables and other electrical connections extend from the back portion of the computer so as to be out of the way and not interfere with the user's hands when he or she is attempting to repair an object or machine or otherwise use their hands. The computer structure is symmetrical; therefore the computer can be turned upside down as a unit for left-hand operation; the cable outlets in this manner always will face the back of the user. Conversely, the mouse controls (when converted to a conventional computer) will always be positioned in the front of the computer housing convenient for the right- or left-handed user. The housing of the computer of this invention has outlets for connection to other components such as monitors, keyboards or any other required component. All embodiments of a mobile computer described in co-pending application Ser. No. 09/092,261 and U.S. Pat. No. 5,305,244 are included in those structures usable in the present invention with the modification described and claimed herein.

The disclosure of U.S. Pat. Nos. 5,305,244 and 5,844,824 and Ser. No. 09/092,261 are incorporated by reference into the present disclosure.

The embodiment of this invention that includes voice activation when the computer is body-worn also includes a body-worn display screen such as a head-worn (or arm-worn display) or the display can be a flip up or other monitor located on the computer housing. The computer housing in the present invention includes all of the components found in a conventional computer such as a storage means, processor means, audio transducer and converter means and recognizing means, all of which are described in detail in U.S. Pat. No. 5,305,244. Also included in this embodiment are means for mounting the computer housing onto a user. Generally, attachment is made on a belt worn by a user such as around the waist, over the shoulder or onto a vest torso. Preferably in a front terminal portion of the computer housing extending outwardly is a heat sink comprising ribbed or louvered sections to permit heat to be dissipated from the interior of the housing and to allow a proper internal temperature best suited for computer operation. Also, it is imperative that this body-worn computer be maintained at temperatures safe and suitable to be worn for extended periods of time. The computer housing bottom section generally is made of a lightweight yet rigid plastic or other suitable non-heat conducting material. In the present invention, a substantial or major portion of the top and side sections of the housing are constructed of a heat-dissipating material which transmits or conducts the heat from the internal portion of the housing away from the user and to the atmosphere. These top and side outer sections (away from the body of the user), together with the above-noted heat sink located in a front raised portion, efficiently dissipates heat from the internal portion of the housing and safe for the user. The housing is contoured or somewhat curved to follow the curvature of the human body such as the torso or waistline. The portion of the computer housing that contacts the user's body has rubber feet or other insulating material that doubles as a belt loop anchor (when used as a body-worn computer). The front underside of the housing will, as mentioned in the preferred embodiment, also have loops attached to the legs through which a belt will fit when attaching to a user. The conduits or connection means which are preferably located in the rear side of the housing are used for cable connection to power means, peripherals, and the body or head-mounted display or conventional monitor. The display used in the present invention can be any type monitor such as head-mounted display, flat panel monitor, wrist or hand-monitor or any other suitable display or monitor.

When the structure of this invention is used as a conventional computer, there are located on the top section of the housing three movable levers, joy sticks or buttons or other means; one to operate a mouse and the other two for program execution or cursor manipulation. When the mobile function is desired, the top, movable button or lever will always be used in the same manner whether worn on the right or left-hand side of the user.

The specific configuration of the presently defined wearable computer provides several improvements over the Newman et al, U.S. Pat. No. 5,305,244, and other known mobile computers. As above noted, a unique problem encountered with wearable computers that is not a problem with stand-alone conventional desk computers, is that heat generated by the CPU could harm the computer or the wearer because of the proximity of the wearer and computer. Many attempts have been made to alleviate this problem, but none have been totally satisfactory. In the present invention, the upper or top portion of the computer (the part away from the user's body) and sides are constructed of a heat-conducting material such as magnesium, aluminum, copper, steel or other suitable known heat conducting materials. This material conducts heat from the interior of the housing and away from the user to the atmosphere. In addition, a heat sink made up of several louvers or ribs is positioned on an extended projecting front section of the housing, thereby diverting the heat away from the user's body. Since the heat generated by the CPU chip and other components is substantial, especially in a body-worn computer, it is extremely important for any successful wearable product to effectively minimize this problem. In the present invention, all sides of the computer housing except the bottom utilize effective heat sinks; the front, top portion and side portions have heat sinks in the form of heat-conducting materials, and the bottom portion (closest the wearer) is constructed of a substantially non-heat conducting material such as some plastics such as ABS resin, FRP resin, rubber, wood, silk, Styrofoam, fiberglass or any other suitable heat-insulating material. It is critical to this invention that the portion of the housing closest the wearer be constructed of a material that will not transmit heat or will minimize the transmission of heat; some of these materials are, as noted, plastics or fiberglass. The extended front section of the housing made up of a heat sink with a plurality of ribs or louvers will also direct heat away from the user's body and assist in maintaining the heat generated to a very tolerable level for the user. This feature of efficient heat dissipating is not present or known in any of the prior art wearable computers. It is important to this invention that this heat sink be constructed so that it acts as an air scoop as the wearer walks forward. The air flow into the heat sink is best accomplished if the heat sink is located in the front of the housing for maximum air intake. Obviously, it cannot be located at the bottom section of the housing since this is the part abutting the wearer's body and little or no air intake is possible. Obviously, if the user wants to put the battery adjacent his or her body (outside the computer housing) this also provides the double insulation of this invention and is within the present invention. Therefore, the battery with a heat insulating cover could be used in the present invention, either inside the housing or outside the housing.

Another way of dissipating heat is by using a small fan. However, placing a fan internally within the computer unit potentially makes the computer vulnerable to ingesting particulates into the computer unit, thereby contaminating and harming the entire system. Additionally, using a fan adds to the system another potential failure point. Therefore, the use of passive cooling mechanisms is most desirable. If however, there are some instances where a fan is suitable in addition to the heat sinks and insulation of this invention, obviously a fan may be considered. In the highly preferred embodiment of this invention, a fan is not used nor required.

One embodiment of this invention includes a voice activation body-supported computer using a body supported display screen such as a head-worn, arm-worn, chest-supported. waist mounted, or neck-hung display. The computer housing in the present invention includes all of the components found in a conventional computer such as a storage means, processor means, audio transducer and converter means, and recognizing means, all of which are described in detail in U.S. Pat. No. 5,305,244. Also included in this embodiment are means for mounting the computer housing onto a user; generally, attachment is made on a belt worn by a user such as around the waist, in a vest, over the shoulder, hereinafter "torso-worn." When the computer of the present invention is used, the outside side of the computer housing adjacent the user is made of a highly insulating material and has adjacent the corresponding inner side wall a battery for supplying power to the system. In addition to supplying power to the system, the battery provides the bonus effect of a double insulating layer (together with the insulating wall) to minimize any heat generated within the housing. Using an internal (inside the computer housing) battery provides several very important advantages:

(a) It avoids the use of an additional cable;
(b) It avoids the need for a separate battery housing; and
(c) Most importantly, it provides an additional insulating layer which is extremely important for wearable or user supported computer systems. It is critical to this invention that at least the computer housing wall adjacent to a user when in use be made of a highly heat-insulating material and that the battery is positioned immediately adjacent the inner face of said wall. It is further critical to this invention that the battery cover be heat insulating to provide a double insulating layer to protect the user and minimize the heat generated from reaching the user's body.

The sides of the computer housing are ribbed or louvered to permit heat to be dissipated from the interior of the housing and to allow proper internal temperature best suited for computer operation. Other suitable heat sinks may be used. The computer housing generally is made of a lightweight, highly heat sensitive yet rigid plastic or other suitable material. It is contoured or curved to follow the curvature of the human body such as the waistline. The portion of the computer housing that contacts the user's body has the above noted two layers of heat insulation. The electrical cord conduit connections found in the back portion of the housing are also contoured to parallel the curvature of the waist. Means are provided to recharge or change the battery when required. Any suitable known means may be used.

The computer of this invention may be combined with or contain communication means.

This communication means would be extremely helpful to the user to order parts or convey other information while using the mobile computer of this invention. Thus, the user does not need to detach him or herself from the mobile computer to call a parts supplier or consultant to assist at the task at hand. This type of communication hookup may be accomplished as follows.

The computer apparatus of this invention apparatus of this invention may be interfaced with a telephone system in such a way as to provide hands-free telephone communication between multiple persons and/or computers. One or more of these may be performing telephone communications by using the present computer apparatus. As earlier noted, communications may include but are not limited to: voice, data, including interrogation and control of built-in test codes, video images and sounds. Operation may be hands-free using the voice activated feature of the present computer apparatus, manually-activated using a keypad, a mouse, a touchpad or a combination of any of these.

Telephone systems that may be interfaced include, but are not limited to, voice over internet protocol (VoIP), RJ-11 wall jacks commonly found in homes and small businesses, multiple line telephone switching systems found in medium and large businesses, cellular communications, radio frequency communications interfaces and cordless accessories to any of the above.

The basic system incorporates the apparatus of this invention, i.e. hands-free body-worn computer with voice activation and a head-mounted display, a telephone system and a unique electronic interface between the two that integrates both traditional analog voice signals and computer data between the two components.

Integration of private as well as public telephone communications into this system is accomplished using a voice/data modem (modulator/demodulator) as now used with existing computing systems. The modem is either built-in to the host computer or it can be inserted as a "PCMCIA" or "PC Card" into the host computer. In addition, communication means in the headset can also utilize a built-in modem to interface through communications means to a remote device. Using the communication means of the system, data and voice can be transmitted and received between headsets and mobile systems as well as between mobile systems.

BRIEF DESCRIPTION OF THE DRAWINGS

FIG. 2 is a perspective view of an embodiment of the present body supported computer as worn on the right side of the waist of a user.

FIG. 3 is a perspective view of an embodiment of the present mobile computer as worn on the left side of the waist of a user.

FIG. 4 is a perspective view of an embodiment of the present hands-free activated computer as worn over the shoulder of a user.

DESCRIPTION OF THE DRAWINGS AND PREFERRED EMBODIMENTS

Figure 1:
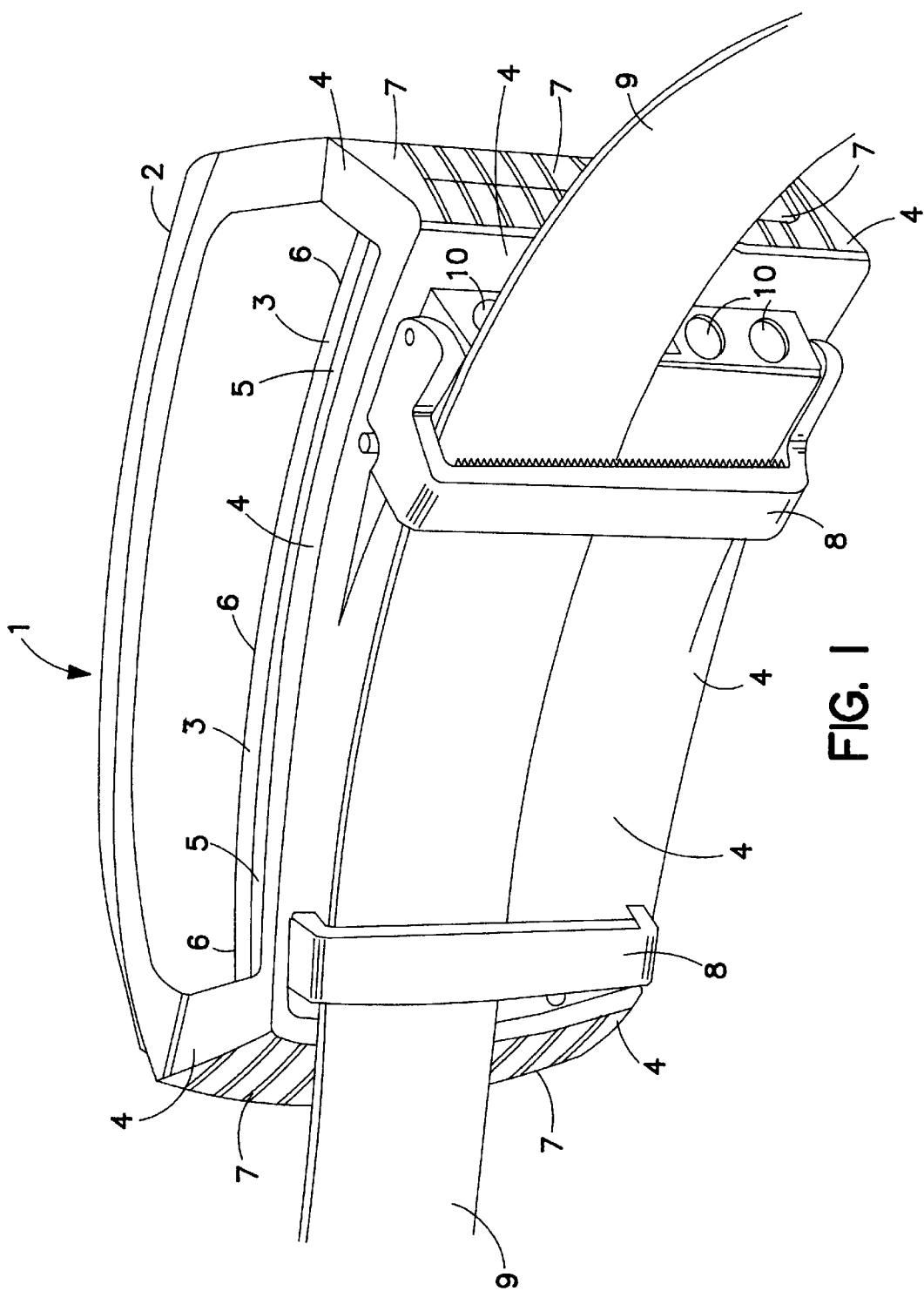
FIG. 1 is a perspective break away bottom view of the user-supported computer of this invention with two layers of insulation on the portion to be worn adjacent a user's body.

In FIG. 1, computer 1 has a computer housing 2 which contains all of the components of a general purpose computer as listed earlier. In addition to these components, a battery 3 is positioned in housing 2 to provide power to the computer system 1. In this FIG. 1, a side is broken away to illustrate the location of the battery 3 adjacent to highly heat insulating side wall or layer 4 which will contact a user when body supported. An additional heat insulating layer (or air) 5 is optionally located between the battery 3 and the inner wall of insulating side 5 to provide triple heat insulating layers. The cover 6 of battery 3 is made of a heat insulating material to provide a double insulating layer, i.e., battery plus side wall 4. In addition, air sink vents 7 are located in at least one side of the housing 2 to further dissipate heat generated within housing 2. These side vents or louvers 7 help reduce the inside heat which could cause malfunctioning or slowing down of the computer functions. In addition, these vents 7 together with the double (or sometimes triple) heat insulating layers provide excellent means to reduce any heat generated that could reach the user. FIG. 1 with a side removed clearly shows the battery 3 position and also other features of the computer housing. Belt loops 8 are used to attach computer 1 to the user's body or to a strap or belt 9. Outlet ports 10 are used to connect peripherals or other items to the computer 1.

In FIGS. 2 and 3, the computer 1 is shown connected to a belt 9 for attachment to a user's body. The cables 11 extend to peripherals such as a head set, display, printer or additional power supply. Note that side 4 will be in touch with a user's body and as such requires the maximum insulation provided by this invention. Again, it is critical to this invention that the internal battery 3 provide both power and additional heat insulation to the computer 1 of this invention.

In FIG. 4, computer 1 of this invention is shown as worn over the torso or shoulder of the user. Here again, the housing is contacting the user's body and the optimized heat insulation of this invention is a significant improvement over the prior art.

Figure 5:
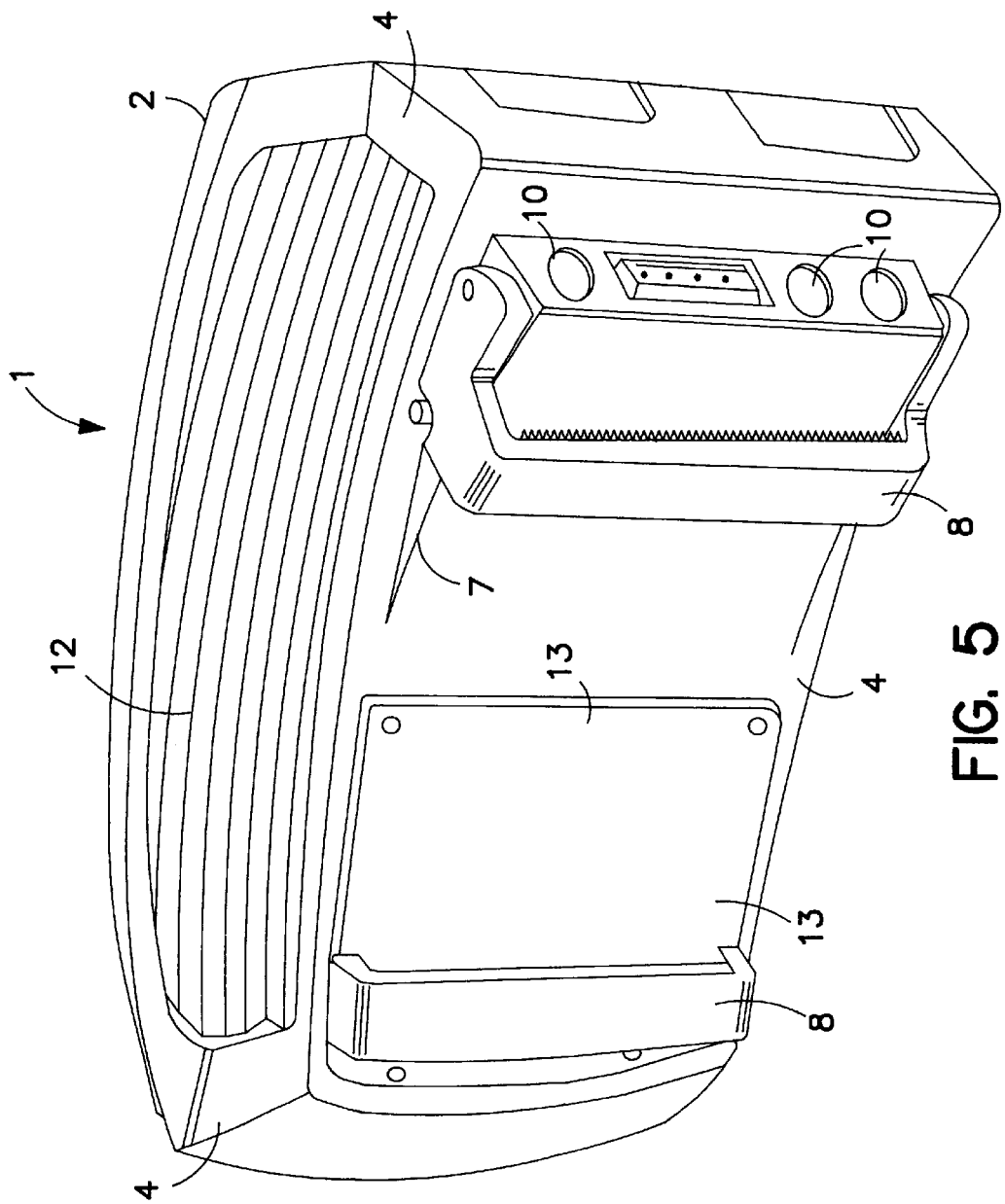
FIG. 5 is a perspective bottom view of one embodiment of the user supported computer of this invention.

FIG. 5 shows computer housing 2 with side air vents or louvers 12 positioned on sides of housing 2 rather than front and back as shown in FIG. 1. Also a door 13 is located in the side wall 4; this door is used to remove the battery 3 for replacement or recharging.

The preferred and optimumly preferred embodiments of the present invention have been described herein and shown in the accompanying drawings to illustrate the underlying principles of the invention, but it is to be understood that numerous modifications and ramifications may be made without departing from the spirit and scope of this invention.

What is claimed is:

1. A user supported, hands-free activation computer system comprising a computer housing and a display means, said computer housing comprising all of the components of a conventional computer and having located therein a battery to supply power to said system, said housing having a section that will be adjacent said user when in use and supported by said user, said section constructed of a heat insulating material and forming thereby an internal insulating wall, said battery comprising an insulating cover which is located in said housing immediately adjacent said internal insulating wall to provide thereby double insulation for any heat generated by said system within said computer housing at a location closest to said user when in use.

2. The system of claim 1 wherein said housing has at least one heat sink on at least one side thereof, said heat sink extending from an internal position of said housing to the atmosphere.

3. The system of claim 1 wherein said internal insulating wall is constructed of a heat insulating plastic material.

4. The system of claim 1 wherein said hands free activation comprises means selected from the group consisting of audio activation means, eye-tracking activation means, electroencephalography activation means and mixtures thereof.

5. The system of claim 1 wherein said computer has means for communicating with a communication means selected from the group consisting of wireless phone, hard-wire phones, infrared transceivers, two-way radios, VoIP, and mixtures thereof.

6. The system of claim 1 wherein said display means is selected from the group consisting of head mounted displays, neck hung displays, chest mounted displays, waist mounted displays, flat panel displays, wrist-arm mounted displays, body supported displays and mixture thereof.

7. The system of claim 1 wherein in addition to said hands-free activation, said system has means for manual activation.

8. The system of claim 1 wherein said computer housing, said display means and said activation means are combined into a single housing worn by the user.

9. The system of claim 1 wherein said computer housing has means for removing said battery for replacement or recharging said battery.

10. The system of claim 1 wherein said battery has means to be recharged while remaining in said housing.

* * * * *